United States Patent [19]

Edstrom et al.

[11] 4,027,785

[45] June 7, 1977

[54] DUAL PUMP COLORANT DISPENSER

[75] Inventors: Keith G. Edstrom, Park Ridge; Gene K. Edstrom, Arlington Heights, both of Ill.

[73] Assignee: Chicago Commutator, Inc., Wheeling, Ill.

[22] Filed: Apr. 12, 1976

[21] Appl. No.: 675,759

[52] U.S. Cl. .................................. 222/135; 222/309
[51] Int. Cl. ............................................. B67d 5/56
[58] Field of Search ........... 222/135, 137, 145, 309

[56] References Cited

UNITED STATES PATENTS 3,908,862  9/1975  Chandra et al. ............... 222/135 X Primary Examiner—Stanley H. Tollberg
Attorney, Agent, or Firm—Wegner, Stellman, McCord, Wiles & Wood

[57] ABSTRACT

A colorant dispenser for the custom blending of paint has a canister with two measuring piston pumps of different capacities, all mounted on a base; and a single barrel valve in the base controls the flow of colorant to and from both pumps and the discharge of colorant from both pumps through a single exit port.

10 Claims, 10 Drawing Figures

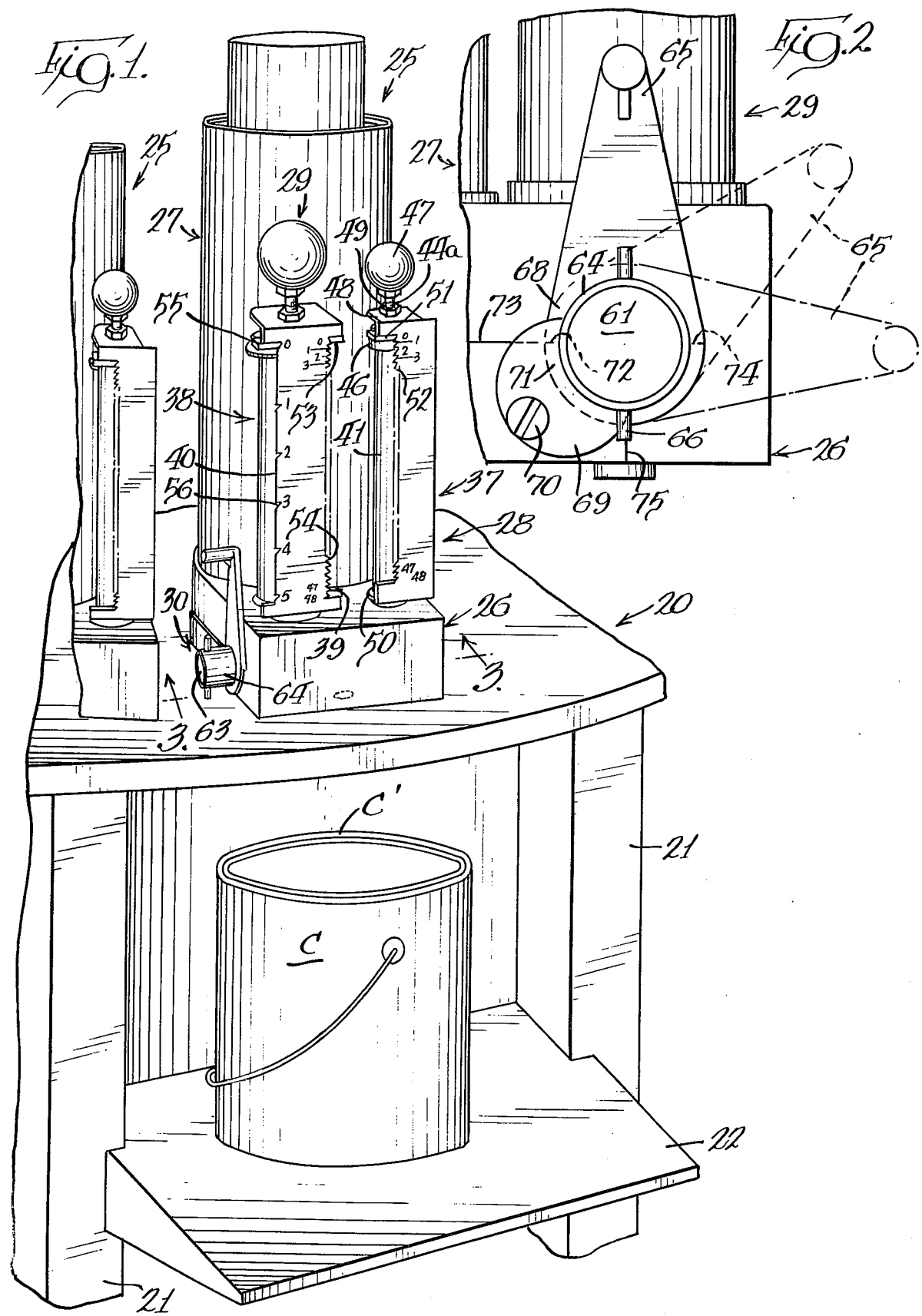

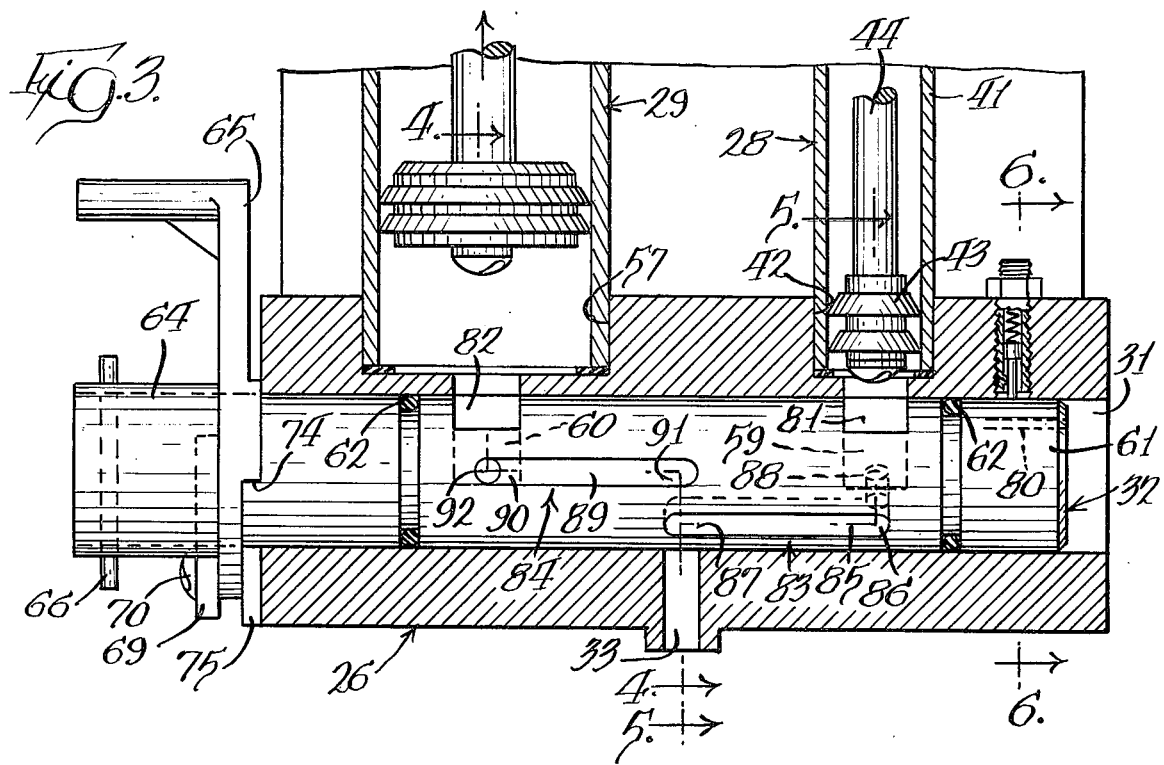
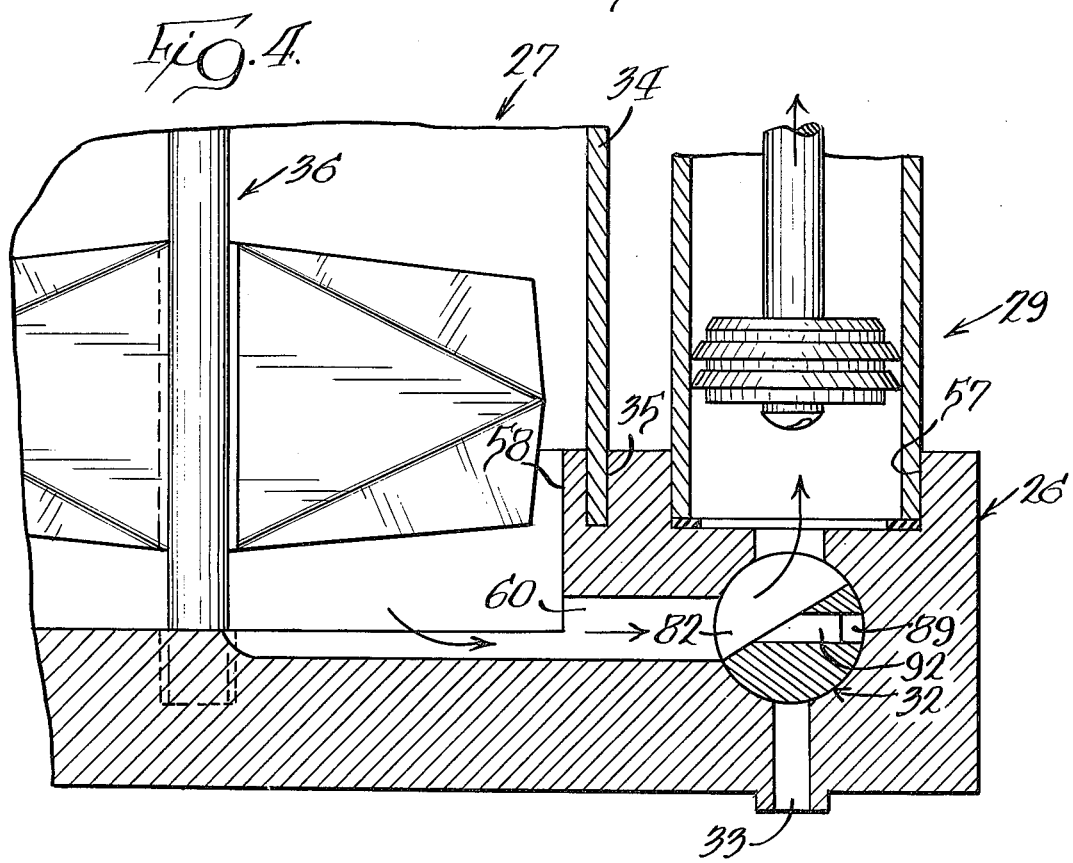

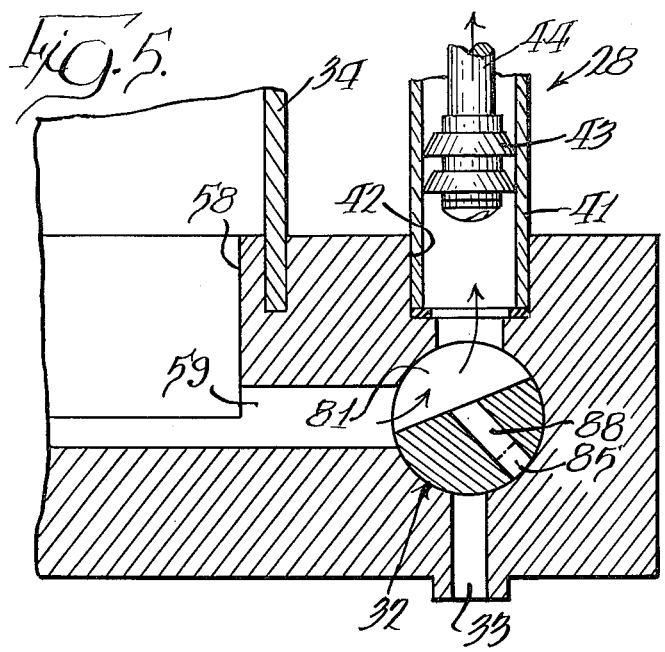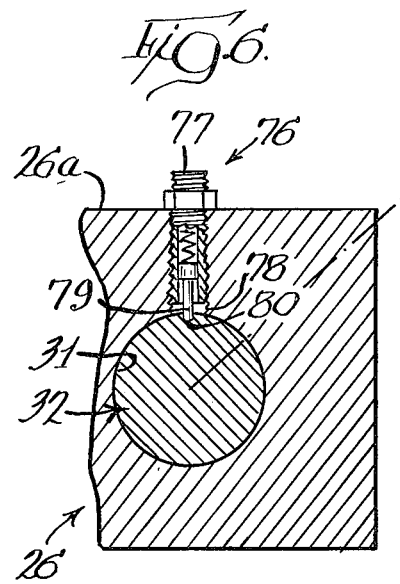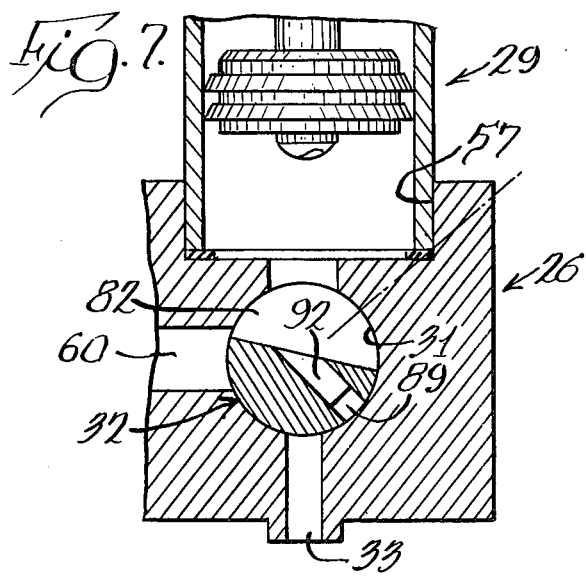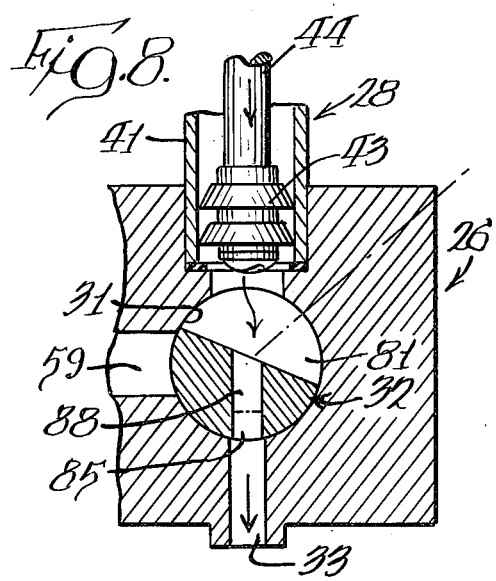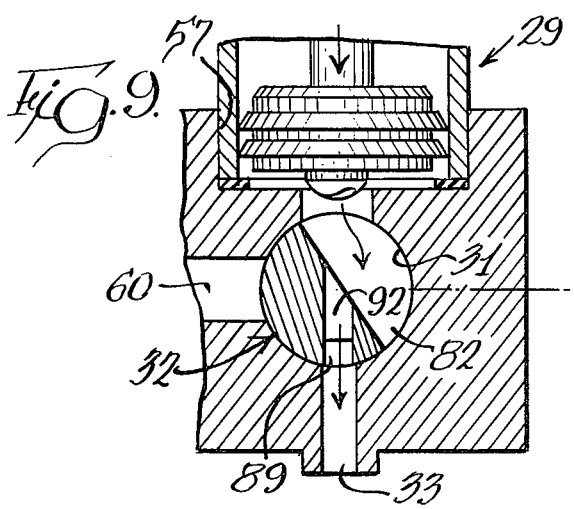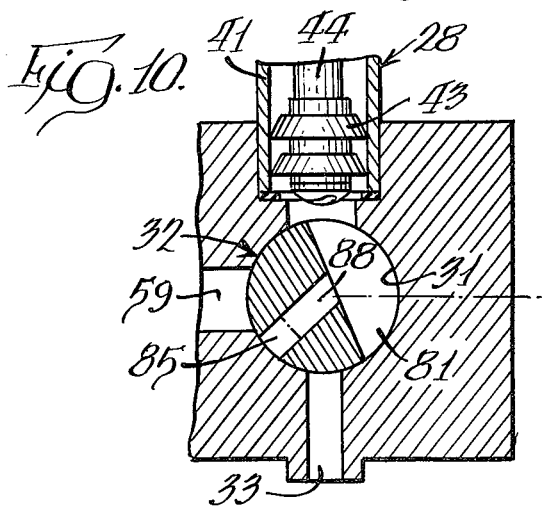

DUAL PUMP COLORANT DISPENSER

BACKGROUND OF THE INVENTION

Colorant dispensers are used in paint shops and hardware stores for the custom blending of paints. Commonly, a colorant dispenser has anywhere from 9 to 18 or more canisters, each of which contains a different colorant, and a custom paint color is prepared by discharging a precisely measured quantity of colorant from one or more of the canisters into a can which contains a predetermined quantity of base white paint. This requires the use of extremely accurate metering means to discharge the requisite precise quantities of colorant from the canisters.

If a relatively small quantity of paint is to be custom blended, it is commonly done by blending specified quantities of colorant with one gallon of white paint; while larger quantities are customarily prepared by blending precise quantities of colorant with five gallons of white paint. In order to provide precise metering of the small quantities of colorant that are sometimes required, it has previously been known to provide two metering piston pumps for each canister, one pump having a maximum capacity of 1 ounce, and the other pump having a maximum capacity of 5 ounces, and there being a calibrated scale associated with each pump which permits as little as 1/96 ounce to be precisely discharged by the 1 ounce pump and as little as 5/96 of an ounce by the 5 ounce capacity pump.

Heretofore a colorant dispenser provided with two pumps also had a separate exit port for the colorant to be discharged from each of the two pumps, although a single valve controlled the flow of colorant from the canister to both pumps and from each pump to its related port.

SUMMARY OF THE INVENTION

The principal object of the present invention is to provide a colorant dispenser in which colorant from either of two metering piston pumps is controlled by a single valve and is discharged through a single exit port. This simplifies the maintenance of the dispensing control valve by eliminating one exit port in which colorant may become dried and difficult of removal.

Furthermore, the provision of a single exit port reduces the likelihood that colorant may dry in the exit port, because of the fact that all colorant from a particular canister is discharged through the one exit port which thus has less idle time in which colorant may harden in it.

Another object of the invention is to provide a valve member which is relatively easy to manufacture in spite of the fact that it has a relatively complex arrangement of inlet ports and discharge passages in order that it may function in the required manner.

THE DRAWINGS

FIG. 1 is a fragmentary front elevational view of a colorant dispenser illustrating one complete colorant dispensing unit embodying the invention;

FIG. 2 is a fragmentary elevational view on an enlarged scale viewing the complete unit of FIG. 1 from the left, and showing the dispensing control valve and handle in solid lines in an intake position and in broken lines in each of two dispensing positions;

FIG. 3 is a fragmentary sectional view on an enlarged scale taken substantially as indicated along the line 3—3 of FIG. 1;

FIG. 4 is a fragmentary sectional view taken substantially as indicated along the line 4—4 of FIG. 3 with the valve member in intake position;

FIG. 5 is a fragmentary sectional view taken substantially as indicated along the line 5—5 of FIG. 3 with the valve member in intake position;

FIG. 6 is a fragmentary sectional view taken substantially as indicated along the line 6—6 of FIG. 3;

FIG. 7 is a fragmentary sectional view similar to FIG. 4 illustrating the valve member in its first dispensing position;

FIG. 8 is a fragmentary sectional view like FIG. 5, illustrating the valve member in its first dispensing position;

FIG. 9 is a fragmentary sectional view like FIG. 7 illustrating the valve member in its second dispensing position; and FIG. 10 is a fragmentary sectional view like FIG. 8 illustrating the valve member in its second dispensing position.

DETAILED DESCRIPTION OF THE INVENTION

The present invention relates to a single canister and its associated metering pumps and colorant dispensing control valve, so only a single complete unit is illustrated. As previously indicated, a custom paint blending apparatus commonly has from 9 to 18 or more such units arranged upon a single platform with an adjustable shelf to receive either a one gallon container or a five gallon container at an appropriate distance below the colorant metering units. One type of such custom paint blending devices has a circular platform with the colorant metering units arrayed around its periphery, and the platform may be indexed to a dispensing station so as to place any desired metering unit in position to dispense colorant into a container at the station.

Referring to the drawings, a platform, indicated generally at 20, is conveniently supported at counter height by legs 21, and a shelf 22 at one side of the platform is vertically adjustable so as to position a container C at a suitable height with reference to the platform, or else to position a much larger container with its upper end in the same plane as that of the upper end C' of the illustrated container. Commonly, the container C will be a one gallon container and the larger container will be a five gallon container. A colorant dispenser unit, indicated generally at 25, is mounted upon the platform 20 in a position to dispense colorant into a container C on the shelf 22. The present invention constitutes an improvement in the discharge control valve and exit port of the unit 25.

The colorant dispenser unit 25 consists generally of a base, indicated generally at 26, which is preferably a plastic molding; a canister, indicated generally at 27, which is supported upon the base; a first vertically oriented measuring piston pump 28 which is mounted upon the base 26 alongside the canister 27; a second vertically oriented measuring piston pump 29 which is also mounted upon the base 26 alongside the pump 28; and a colorant intake and discharge system, indicated generally at 30, which includes a system of passages in the base 26 which connect with a horizontal bore 31 in the base, and a barrel valve member, indicated generally at 32, which is rotatably mounted in the bore 31 to control the flow of colorant between the canister 27 and the pumps 28 and 29, and between the pumps and a single exit port 33 which is in a vertical plane between the axial planes of the pumps 28 and 29.

The canister 27 is a cylindrical, stainless steel tube 34 the lower end of which is seated in an annular slot 35 in the base 26. An agitator assembly, indicated generally at 36, is removably mounted in the canister 34 and is adapted to be driven by an electric motor in a way which is common to colorant dispensers of the prior art.

The piston pumps 28 and 29 are identical except for their maximum capacities and for their related metering scales. Commonly, the first pump 28 has a maximum capacity of 1 ounce and has a scale, indicated generally at 37, which is divided into 1/48 ounce increments; while the pump 29 has a maximum capacity of 5 ounces and has a double scale, indicated generally at 38, which has a first side 39 divided into 48 equal increments and a second side 40 which is marked in fractions of an ounce.

The pump 28 is seen to consist of a cylinder 41 the lower end of which is mounted in a circular recess 42 in the base 26; and a piston 43 in the cylinder 41 is carried at the lower end of a piston rod 44 which slides in a bushing which is carried in a cylinder top closure 46, and there is a manual piston operating knob 47 at the upper end of the rod. The scale 37 is seen to have a top flange 48 which is carried between a set of mounting nuts 49 that are screwed onto a threaded upper end portion 44a of the piston rod; while at the lower end of the scale 37 is an annular guide 50 which loosely embraces the cylinder 41 so that the scale 37 moves up and down with the piston. An indicator 51 is mounted upon the cylinder 41 alongside the scale 37, and the scale may be turned about the piston rod 44 so as to engage any of a series of teeth 52 on the side of the scale with the indicator 51.

As previously indicated, the pump 29 is identical with the pump 28 except for being of larger capacity and except for having a double scale 38. In order to make the double scale effective, the pump 29 has a first indicator 53 which is alongside a series of notches 54, and a second indicator 55 which is alongside a series of notches 56 of the fractional ounce scale 40. The second pump 29 seats in a circular recess 57 in the base 26.

The system of passages in the base 26, heretofore referred to, starts from a circular well 58 which is formed in the base at the bottom of the canister 34; and from the well 58 a first intake passage 59 connects with the horizontal bore 31 in the vertical plane of the first pump 28; and a second intake passage 60 from the well 58 connects with the bore 31 in the vertical plane of the second pump 29. Thus, the intake passages 59 and 60 make it possible for the pumps 28 and 29 to draw colorant from the canister 34 when their respective pistons are moved upwardly.

The valve member 32 consists of a solid cylindrical steel plug 61 which has grooves to receive O-rings 62 which flank the intake passages 59 and 60, so that while the valve member 32 is rotatable in the bore 31, it is sealed against leakage of colorant from either end of the bore. The valve member has a projecting end portion 63 which is surrounded by a collar 64 with which an operating handle 65 is integrally formed, and the collar is fixed to the end portion 63 of the valve member by a pin 66 which impales the collar and a bore 67 in the valve member. The handle 65 includes a circumferentially extending flange 68 that surrounds the sleeve 64, and a valve retainer 69 which is secured to the base 26 by a screw 70 has a concave marginal portion 71 overlying the flange 68 so as to retain the valve member 32 in the bore 31. The handle 65 may be used to rotate the valve member 32 between an intake position in which the handle is vertical, a first dispensing position in which the handle is at a 45° angle clockwise from the vertical, and a second dispensing position in which the handle is horizontal. The collar 64 has a first shoulder 72 which abuts a first shoulder 73 on the base 26 when the valve is in its intake position; and a second shoulder 74 on said collar abuts a second shoulder 75 on the base when the valve is in its second dispensing position. Rotation of the valve is arrested at the first dispensing position by the action of a detent means, indicated generally at 76, which consists of a threaded stem 77 which is mounted in a threaded bore 78 which extends from the top surface 26a of the base 26 into the top of the horizontal bore 31, a spring pressed pin 79 in the bottom of the stem, and a shallow recess 80 in the circumferential surface of the valve member with which the spring pressed pin engages when the valve is at its first dispensing position.

The valve member 61 has a first transverse slot 81 which is in the vertical plane of the first pump 28, and a second transverse slot 82 which is in the vertical plane of the second pump 29, and said transverse slots provide first and second inlets in the valve member. When the valve member is in its intake position, the slot 81 provides a communicating inlet between the intake passage 52 and the recess 42 at the bottom of the first pump 28; and the slot 82 provides inlet communication between the intake passage 60 and the recess 57 at the bottom of the second pump 29. Each of the intake slots is cut at such an angle that when the valve member 61 is rotated to the position for dispensing from the associated pump, communication is blocked between the pump and the related intake passage.

The valve member 61 also has a first discharge passage, indicated generally at 83, and a second discharge passage, indicated generally at 84. The first discharge passage 83 consists of a longitudinal groove 85 in the surface of the valve member 61, and the groove 85 has a first end portion 86 in the vertical plane of the first pump 29 and has a second end portion 87 in the vertical plane of the exit port 33. The discharge passage 83 also includes a bore 88 which is formed radially in the valve member 61 and connects the inlet slot 81 with the groove 85.

The second discharge passage 84 includes a longitudinal slot 89 formed in the circumferential surface of the valve member 61 and spaced circumferentially 45° from the slot 85. The slot 89 has a first end portion 90 which is in the same vertical plane with the second pump 29, and it has a second end portion 91 which is in the same vertical plane with the exit port 33; and a radial bore 92 connects the inlet slot 82 with the groove 89. When the valve member 61 is in its intake position, the groove 85 and the bore 88 are located 45° downwardly from a horizontal diameter of the valve member 61, while the groove 89 and the bore 92 are on said horizontal diameter. Thus in this position there is no communication between either of the intake slots and the exit port 33; and as previously indicated in this position both of the inlet slots 81 and 82 provide communication between the intake passages 59 and 60 and the respective pumps 28 and 29. Thus, as long as the valve member 61 is at intake position either of the pumps may be charged with any desired amount of colorant by elevating the piston until the number on the associated gauge scale is opposite the indicator, and then turning the scale to engage the indicator with the aligned notch in the gauge scale to prevent inadvertent downward movement of the piston. If the first pump 28 is charged with colorant, the valve member 61 is rotated 45° to the first dispensing position, thus placing the bore 88 and slot 85 in communication with the exit port 33, and the gauge scale notch is then disengaged from the indicator so that the piston may be depressed to dispense the charge of colorant through the exit port and into a container C on the shelf 22.

If the second pump 29 is charged with colorant with the valve member 61 in its intake position, then the valve member is rotated 90° to the second dispensing position where the bore 92 and the slot 89 are in communication with the exit port 33 so that moving the piston of the pump 29 downwardly dispenses the colorant from the pump through the exit port 33.

The foregoing detailed description is given for clearness of understanding only and no unnecessary limitations should be understood therefrom as modifications will be obvious to those skilled in the art.

We claim:

1. In a colorant dispenser of the type which has a colorant canister supported on a platform, a shelf at a side of the platform on which a paint container may rest to receive colorant from said canister, first and second vertically oriented measuring piston pumps positioned side by side in operative association with the canister for dispensing precise quantities of colorant from the canister, said first pump having a predetermined maximum capacity and said second pump having a maximum capacity which is an even multiple of the maximum capacity of said first pump, and a single valve to control the discharge of colorant from both said pumps to a container, the improvement comprising:

a base for the canister and pumps which has a horizontal bore beneath the pumps;

a first intake passage in the base connecting the canister to said bore in the vertical plane of the first pump;

a second intake passage in the base connecting the canister to said bore in the vertical plane of the second pump;

a single exit port from the bore to the exterior of the base, said exit port being in a transverse vertical plane between the pumps;

and a barrel valve member mounted in the bore for rotation between an intake position, a first dispensing position and a second dispensing position;

said valve member having a first inlet which communicates with the first passage and with the first pump when the valve member is in intake position;

said valve member having a second inlet which communicates with the second passage and with the second pump when the valve member is in intake position;

a first discharge passage in the valve member which extends from the first inlet to a first part of the valve surface which is in the same transverse vertical plane as the exit port and which is circumferentially spaced from said exit port when the valve is in intake position;

a second discharge passage in the valve member which extends from the second inlet to a second part of the valve surface which is in the same transverse vertical plane as the exit port and which is circumferentially spaced from said exit port when the valve is in intake position, said first and second parts of the valve surface being circumferentially spaced from one another;

means for rotating said valve member from said intake position in which neither discharge passage communicates with the exit port selectively to said first dispensing position in which the first discharge passage communicates with the exit port or to said second dispensing position in which said second discharge passage communicates with said exit port, each inlet being closed to the canister when its discharge passage communicates with the exit port;

positive stop means for stopping rotation of the valve member at its intake position and at its second dispensing position;

and detent means for arresting rotation of the valve member at its first dispensing position;

whereby either metering pump may be selectively operated to charge it with a desired amount of colorant when the valve member is in intake position, and the valve member may then be rotated selectively to the dispensing position which places the charged pump in communication with the exit port so the charge of colorant may be dispensed through said port.

2. The improvement of claim 1 in which each inlet is provided by a transverse slot in a side of the valve member.

3. The improvement of claim 2 in which each discharge passage includes a longitudinal groove in the circumferential surface of the valve member and a lateral bore between the groove and the related inlet slot.

4. The improvement of claim 3 in which the intake position and the second dispensing position are 90° apart, and the first dispensing position is 45° from both of said positions.

5. The improvement of claim 4 in which the detent means comprises a recess in the circumferential surface of the valve member, and a spring pressed pin in an inner end of a threaded stem which is mounted in a threaded bore in the base, said recess being aligned with the spring pressed pin when the valve member is in the first dispensing position.

6. The improvement of claim 1 in which each discharge passage includes a longitudinal groove in the circumferential surface of the valve member and a lateral bore between the groove and the related inlet.

7. The improvement of claim 6 in which the intake position and the second dispensing position are 90° apart, and the first dispensing position is 45° from both of said positions.

8. The improvement of claim 1 in which the means for rotating the valve member comprises a handle secured to an end portion of said member alongside the base, said handle being vertical in the intake position of the valve member, at a 45° angle in the first dispensing position, and horizontal in the second dispensing position.

9. The improvement of claim 1 in which the exit port is at the bottom of the bore and is vertical.

10. The improvement of claim 1 in which the valve member has a first transverse slot providing the first inlet, a second transverse slot providing the second inlet, a first longitudinal groove which has a first end portion in the transverse plane of the first slot and a second end portion in the transverse plane of the exit port, said first groove being connected to the first slot by a radial bore and being 45° below a horizontal diameter of the valve member in intake position, and a second longitudinal groove which has a first end portion in the transverse plane of the second slot and a second end portion in the transverse plane of the exit port, said second groove being connected to the second slot by a radial bore and being on the horizontal diameter of the valve member in intake position, and in which the exit port is at the bottom of the bore and is vertical.

* * * * *